US006573908B1

(12) United States Patent
Jang

(10) Patent No.: US 6,573,908 B1
(45) Date of Patent: Jun. 3, 2003

(54) METHOD AND SYSTEM FOR PROVIDING OBJECT INFORMATION WITHIN FRAMES OF MOVING IMAGE DATA

(75) Inventor: Young Kyu Jang, Seoul (KR)

(73) Assignee: Korea Firstec Co., Ltd., Seoul (KR)

(*) Notice: Subject to any disclaimer, the term of this patent is extended or adjusted under 35 U.S.C. 154(b) by 0 days.

(21) Appl. No.: 09/545,790

(22) Filed: Apr. 7, 2000

(30) Foreign Application Priority Data

Nov. 9, 1999 (KR) .............................................. 99-49526

(51) Int. Cl.[7] ................................................. G09G 5/00
(52) U.S. Cl. ........................................ 345/723; 345/716
(58) Field of Search ................................. 345/716, 719, 345/723, 724, 726; 725/61, 136, 60; 705/26, 27; 707/501.1

(56) References Cited

U.S. PATENT DOCUMENTS

| | | | | |
|---|---|---|---|---|
| 5,696,905 A | * | 12/1997 | Reimer et al. ............... | 345/723 |
| 5,877,755 A | * | 3/1999 | Hellhake ..................... | 709/219 |
| 6,026,376 A | * | 2/2000 | Kenney ....................... | 705/26 |
| 6,052,492 A | * | 4/2000 | Bruckhaus ................... | 382/284 |
| 6,131,086 A | * | 10/2000 | Walker et al. ............... | 345/716 |
| 6,154,771 A | * | 11/2000 | Rangan et al. .............. | 345/660 |
| 6,172,672 B1 | * | 1/2001 | Ramasubramanian et al. .......................... | 345/720 |
| 6,205,231 B1 | * | 3/2001 | Isadore-Barreca et al. .. | 382/103 |
| 6,243,713 B1 | * | 6/2001 | Nelson et al. .............. | 704/231 |
| 6,295,055 B1 | * | 9/2001 | Miller et al. ................ | 345/700 |
| 6,342,904 B1 | * | 1/2002 | Vasudevan et al. ......... | 345/723 |
| 6,442,538 B1 | * | 8/2002 | Nojima .......................... | 707/1 |
| 6,462,754 B1 | * | 10/2002 | Chakraborty et al. ........ | 345/723 |
| 6,463,444 B1 | * | 10/2002 | Jain et al. ................... | 707/104.1 |

FOREIGN PATENT DOCUMENTS

JP          07336651 A  * 12/1995  ............ H04N/7/01

* cited by examiner

*Primary Examiner*—John Cabeca
*Assistant Examiner*—Shawn Becker
(74) *Attorney, Agent, or Firm*—Katten Muchin Zavis Rosenman

(57) ABSTRACT

In a method for editing moving image data (MID) and providing object information (OI) based on the MID for use in an OI system, the system includes a server, user interfaces (UIs) and a communication network connecting the UIs to the server. The method comprises the steps of: (a) compressing the MID having frames, thereby supplying compressed moving image frames (CMIFs); (b) storing the CMIFs; (c) extracting frames from the CMIF, thereby obtaining extracted frames (EFs) and location information (LI) thereof; (d) inserting one or more events at corresponding predetermined positions in each of the EFs to thereby supply modified frames (MFs), wherein each event is an image of predetermined shape indicating a corresponding object in each of the MFs; (e) storing the MFs; (f) at the server's end, offering an initial information page (IIP) to a user through a corresponding UI; (g) at the user's end, based on the IIP, choosing a desired program (DP) having the CMIF through the corresponding UI; (h) at the server's end, providing the DP the user; and (i) at the server's end, when the user selects a desired frame among frames of the CMIFs, supplying one or more matched MFs corresponding to the selected desired frame based on the LI thereof, wherein the matched MF is a closest MF in view of sequence of the CMIFs.

16 Claims, 4 Drawing Sheets

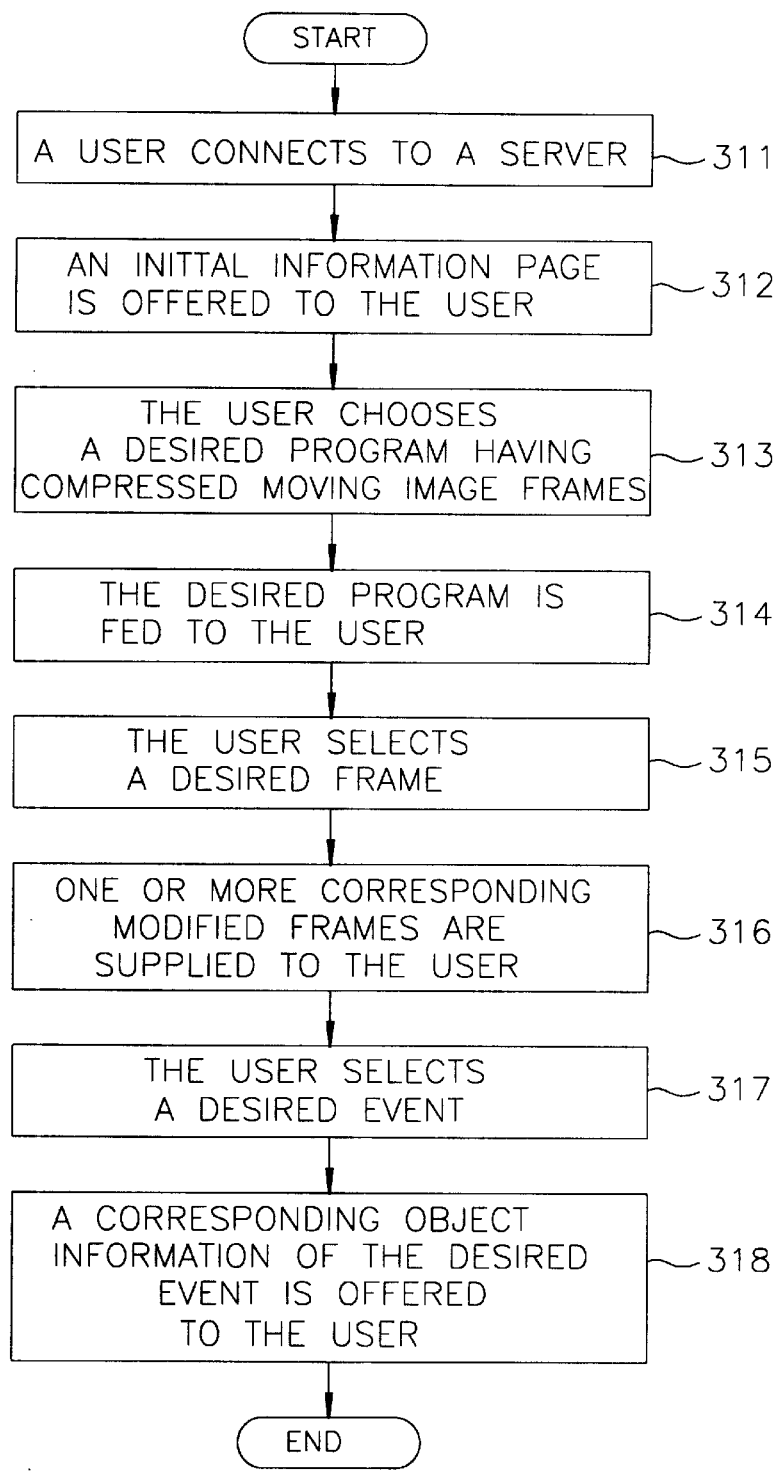

METHOD AND SYSTEM FOR PROVIDING OBJECT INFORMATION WITHIN FRAMES OF MOVING IMAGE DATA

FIELD OF THE INVENTION

The present invention relates to a method and system for processing moving image data; and more, particularly, to a method and system for editing moving image data and providing object information based thereon.

BACKGROUND OF THE INVENTION

Broadly defined electronic commerce is a modern business methodology that addresses the needs of organizations, merchants, and consumers to cut costs while improving the quality of goods and services and increasing the speed of service delivery. More commonly, e-commerce is associated with the buying and selling of information, products, and services, at present, via computer networks and will be in the future via any one of myriad of networks that will make up the Information Superhighway (I-way).

As the electric commerce spreads, many consumers may want to get information about products, items, or services and so on appearing on a TV or PC monitor screen while watching a movie or drama thereon. For example, when a viewer watches a movie or a drama having moving images on a TV, the viewer may be interested in various products or items, e.g., books, magazines or electric home appliances, appearing as a part of background image viewed on a TV screen. Further, the viewer also may be interested in various accessories, e.g., a cap, a dress and an earring of an actress.

However, there has been no reasonable conventional method and/or tool readily available for providing information to viewers about such products or items appearing on a screen as a part of a moving image.

SUMMARY OF THE INVENTION

It is, therefore, a primary object of the present invention to provide a method and system for editing moving image data and providing object information based thereon to users through a communication network.

In accordance with the present invention, there is provided a method for editing moving image data and providing object information based on the moving image data for use in an object information providing system, the system including a server, a plurality of user interfaces and a communication network connecting the user interfaces to the server, the method comprising the steps of: (a) compressing the moving image data having a plurality of frames, thereby supplying compressed moving image frames; (b) storing the compressed moving image frames; (c) extracting frames from the compressed moving image frames in a preset extraction ratio by employing a predetermined technique, thereby obtaining extracted frames and location information thereof within the compressed moving image frames; (d) inserting one or more events at corresponding predetermined positions in each of the extracted frames to thereby supply modified frames, wherein each event is an image of predetermined shape indicating a corresponding object in each of the modified frames; (e) storing the modified frames; (f) at the server's end, offering an initial information page to a user through a corresponding user interface; (g) at the user's end, based on the initial information page, choosing a desired program having the compressed moving image frames through the corresponding user interface; (h) at the server's end, providing the desired program to the user; and (i) at the server's end, when the user selects a desired frame among the compressed moving image frames, supplying a matched modified frame corresponding to the selected desired frame based on the location information thereof, wherein the matched modified frame is a closest modified frame of the compressed moving image frames.

BRIEF DESCRIPTION OF THE DRAWINGS

The above and other objects and features of the present invention will become apparent from the following description of preferred embodiments given with reference to the accompanying drawings, in which:

FIG. 2 depicts a flow chart for representing a method for providing object information in accordance with a preferred embodiment of the present invention.

DETAILED DESCRIPTION OF THE PREFERRED EMBODIMENTS

Figure 1:
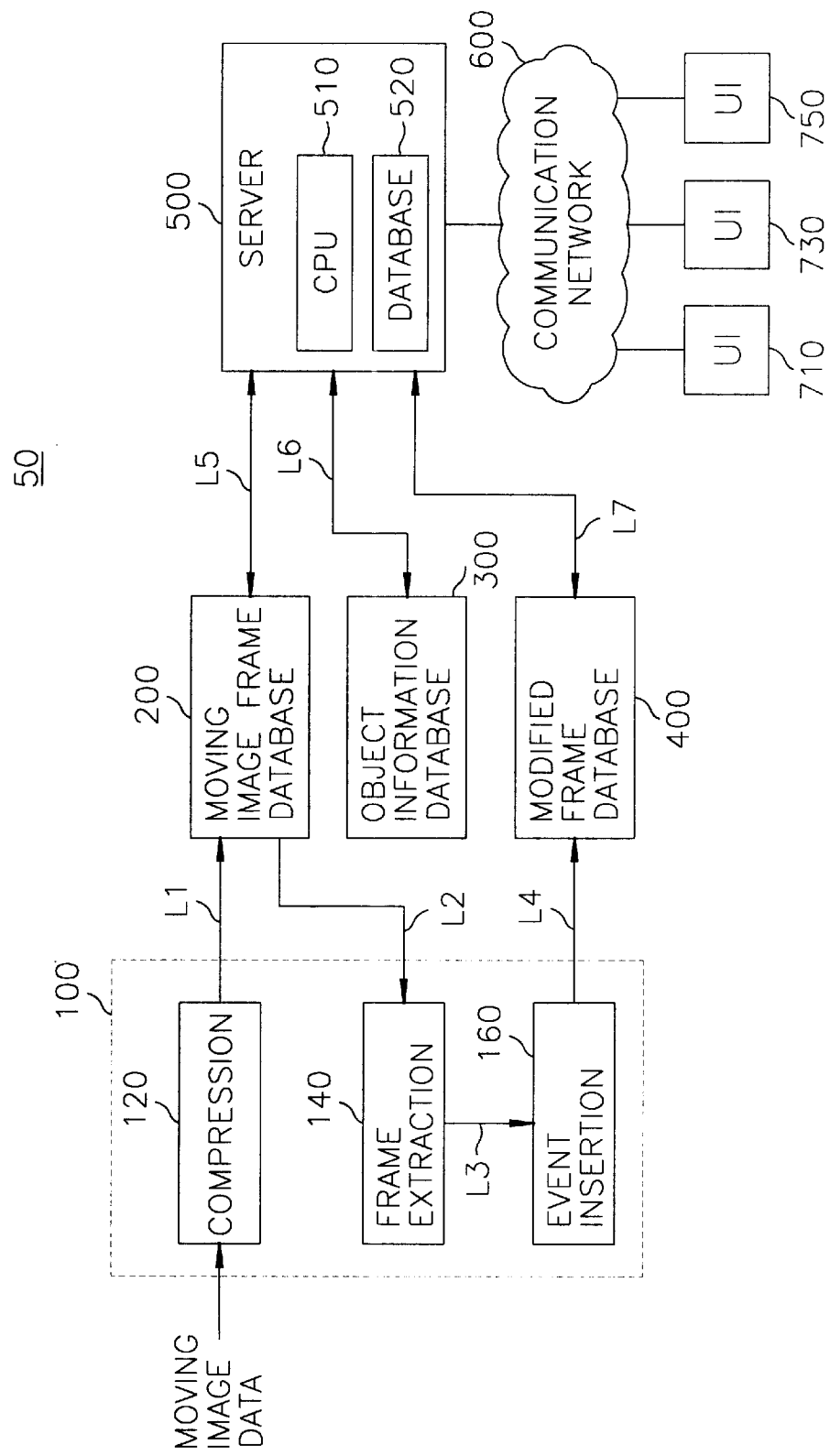
FIG. 1 shows an object information providing system for editing moving image data and providing object information based thereon in accordance with a preferred embodiment of the present invention.

Referring to FIG. 1, there is shown an object information providing system 50 for editing moving image data and providing object information based thereon in accordance with a preferred embodiment of the present invention. FIG. 2 depicts a flow chart for representing a method for providing object information in accordance with a preferred embodiment of the present invention.

FIGS. 3A to 3D represent information pages offered to users during a process for providing object information in accordance with the preferred embodiment of the present invention. From now on, referring to FIGS. 1 to 3, a method and system for editing moving image data and providing object information based thereon to users through a communication network in accordance with preferred embodiments of the present invention will be described in detail. It should be noted that in the Figures, same reference numerals indicate same things.

The system 50 comprises a moving image editing apparatus 100, a moving image frame database 200, an object information database 300, a modified frame database 400, a server 500, a communication network 600 and user interfaces 710, 730 and 750.

The moving image editing apparatus 100 includes a compression circuit 120, a frame extraction circuit 140 and an event insertion circuit 160. The server 500 includes a central processing unit (CPU) 510 and a database 520. The CPU 510 controls overall operation of all the circuits or apparatus in the system 50.

The communication network is typically an internet employing HTTP (hypertext transfer protocol). But the communication network may be another network, e.g., a local area network (LAN), value added network (VAN), wide area network (WAN), ISDN (integrated services digital network), BISDN (broad integrated services digital network) or a wireless broadcasting network. The user interfaces 710, 730 and 750 are typically personal computers, but not limited thereto. For example, the user interfaces may be wireless mobile phones or digital TV's, respectively.

The moving image editing apparatus 100 performs editing on moving image data, e.g., video and audio signals of a drama or a movie program, thereby providing compressed moving image frames and modified frames. Moving image data may have various formats.

In detail, the compression circuit 120 in the moving image editing apparatus 100 first receives moving image data having a plurality of frames from an outer raw moving image data source apparatus, e.g., a digital TV, a video cassette recorder or a personal computer provided with a CD driver. It should be noted that there are many other devices for providing the raw moving image data.

Then, the compression circuit 120 compresses the moving image data by employing a known technique, e.g., a MPEG (Moving Pictures Experts Group) algorithm, thereby supplying compressed moving image frames to the moving image database 200 via a line L1. It should be noted that if the moving image data are fed to the compression circuit 120 in analog form, the compression circuit 120 converts the moving image data into digitized moving image data at an analog to digital converter (not shown) therein and then compresses the digitized moving image data as compressed moving image frames.

The moving image database 200 stores therein the compressed moving image frames. These compressed moving image frames are supplied to the frame extraction circuit 140 via a line L2. The frame extraction circuit 140 extracts frames from the compressed moving image frames by using a predetermined technique, thereby obtaining and then feeding extracted frames and location information thereof within the compressed moving image frames to the event insertion circuit 160 through a line L3. In this case, the extraction ratio can be expressed as F1/F2, wherein F1 and F2 represent the number of frames in the original compressed moving image frames and the number of extracted frames, respectively. In a preferred embodiment of the present invention, the extraction ratio ranges from about 50 to about 200.

In detail, the frame extraction circuit 140 first searches for candidate extracting frames in a preset extraction ratio, e.g., 50, from the compressed moving image frames by employing, e.g., a decimation method and then estimates a degree of similarity, e.g., AES (absolute error sum) of pixel values, between adjacent candidate extracting frames, e.g., between a current frame and a previous frame, by employing a motion estimation technique.

Then, the frame extraction circuit 140 selects, based on the result of the estimated degree of similarity obtained, extracted frames among the candidate extracted frames, thereby obtaining and then feeding the extracted frames and location information thereof within the compressed moving image frames to the event insertion circuit 160, wherein the extracted frames are the candidate extracted frames in which the estimated degree of similarity obtained satisfy a condition based on a predetermined threshold.

Figure 3A:
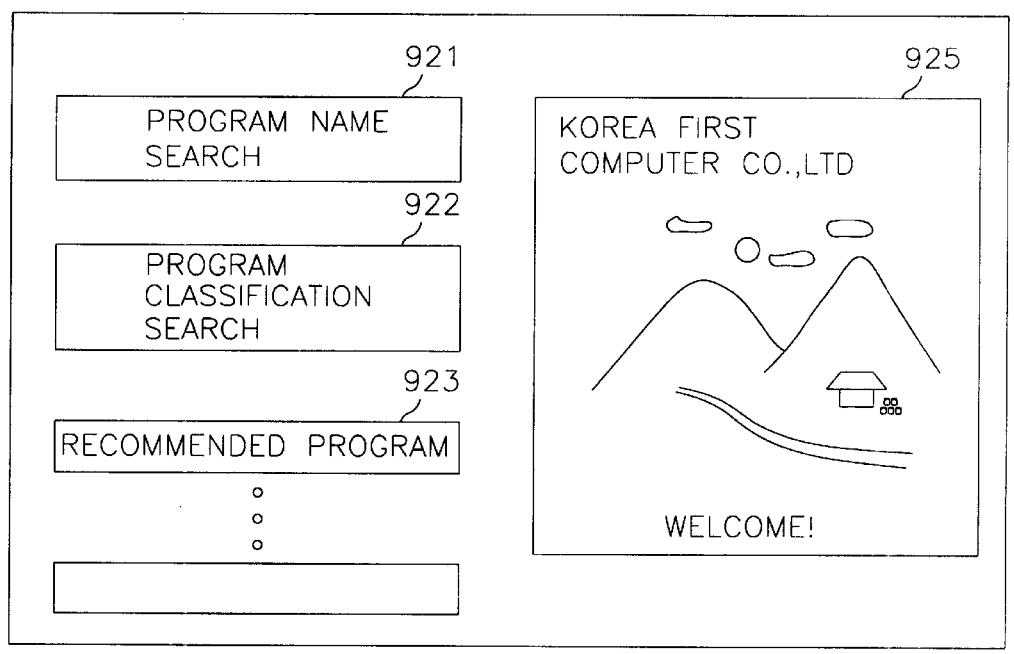
FIGS. 3A to 3D represent information pages offered to users during a process for providing object information in accordance with the preferred embodiment of the present invention.
Figure 3B:
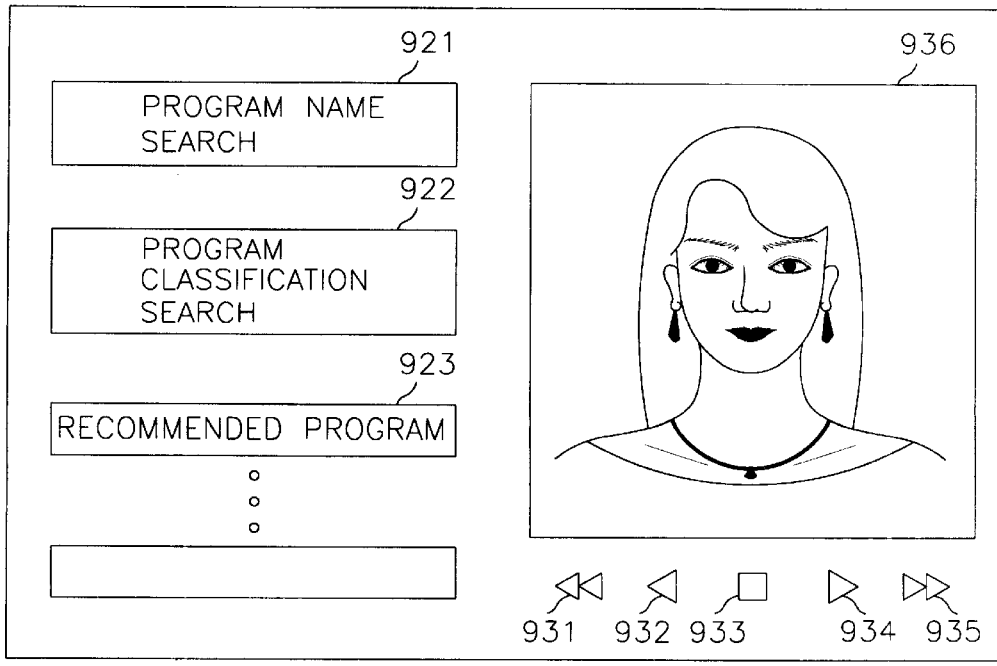
Figure 3C:
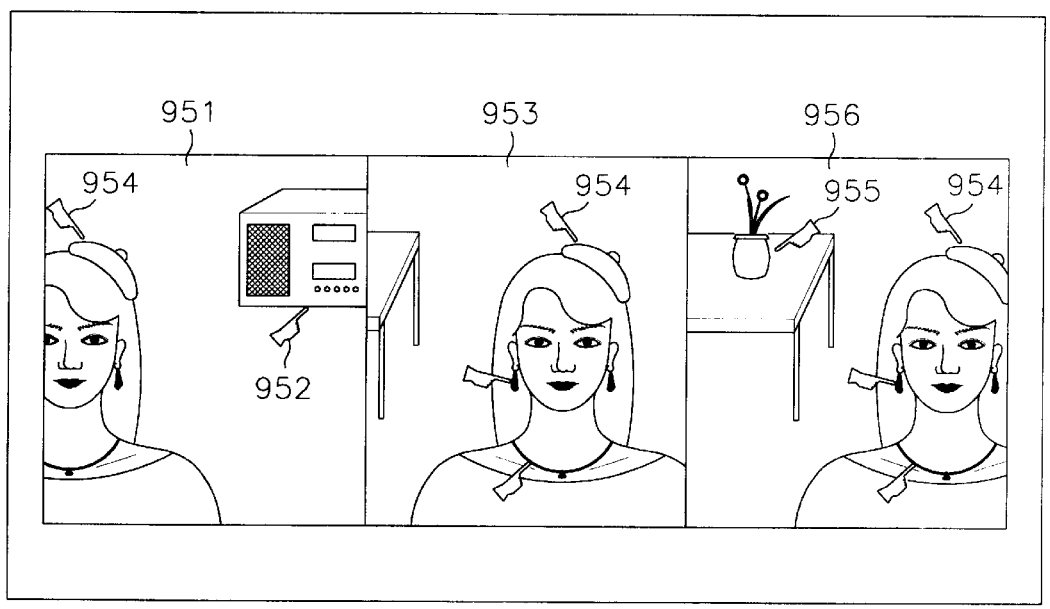

The event insertion circuit 160 inserts one or more events at corresponding predetermined positions in each of the extracted frames by employing a preset insertion technique, e.g., a map tag technique, thereby supplying modified frames, wherein each event is an image of predetermined shape, e.g., a hand image as shown in FIG. 3C, indicating a corresponding object in each of the modified frames. In this case, an object represents a corresponding product or item in a corresponding modified frame appearing as a predetermined shape of image viewed on a screen of a corresponding user interface.

Figure 3D:
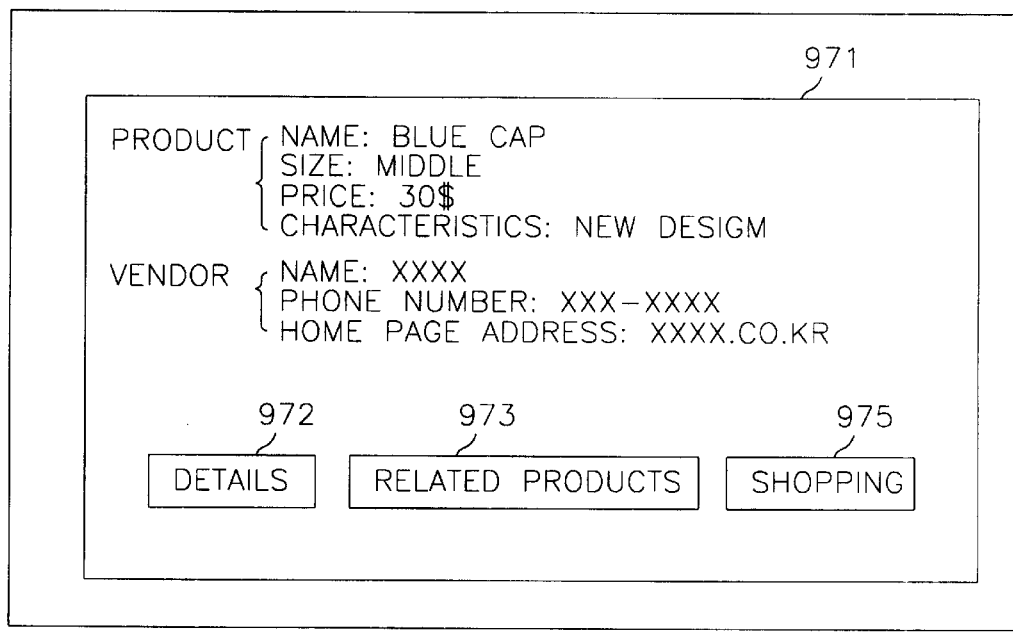

The modified frames are coupled to the modified frame database 400 through a line L4. The modified frame database stores the modified frames therein. In the object information database 300, there is previously stored information for objects, e.g., product or vender related information as shown in FIG. 3D.

From now on, referring to FIGS. 2 and 3A to 3D, there will be described a method or process for providing object information in accordance with a preferred embodiment of the present invention. First, at a step 311, a user connects itself with the server 500 through the communication network 600 via a corresponding user interface. Then, at a step 312, the server offers an initial information page, e.g., a web-page, to the user, e.g., on a screen of the corresponding UI, e.g., UI 710 through the corresponding user interface.

At a step 313, the user, based on the information given in the initial information page, chooses a desired program having compressed moving image frames through the corresponding UI.

In detail, for example, referring to FIG. 3A, there is an exemplary web-page 900 including a program name search window 921, a program classification search window 922, a recommended program window 923 and an initial monitor screen 925.

The user may choose the desired program through the use of either the program name search window 921 or the program classification search window 922, wherein the search windows 921 and 922 allow the user to search for a desired program by employing a respective predetermined search technique. The user also may choose the desired program by using the recommended program window 923. For simplicity, detailed procedures executed-in the windows 921, 922 and 923, which are well-known in the art are omitted.

Next, at a step 314, the server feeds the desired program to the user. In detail, in response to a request for the desired program having the compressed moving image frames from a user interface, the server 500 retrieves the same from the moving image frame database 200 through a line L5 and then provide the same to a corresponding user interface through the communication network 600.

FIG. 3B represents an exemplary frame 936 in a web-page 930 as a screen image of the desired program having the compressed moving image frames for a movie chosen by the user. In FIG. 3B, there are illustrated a fast rewind menu 931, a rewind menu 932, a stop menu 933, a playback menu 934, a fast forward menu 935. For simplicity, detailed functional operations of these menus which are well-known in the art are omitted.

Thereafter, at a step 315, the user selects a desired frame, e.g., the frame 936, among the compressed moving image frames. Then, at a step 316, when the user selects the desired frame, the server 500 supplies one or more matched modified frames, e.g., modified frames 951, 953, and 956 in a web-page 950 as shown in FIG. 3C, corresponding to the selected desired frame based on the location information thereof.

In accordance with another preferred embodiment of the present invention, in the step 316, when the user selects the desired frame, the server 500 may provide only one matched modified frame. In this case, the matched modified frame will be a closest modified frame to the desired frame.

In detail, in accordance with a preferred embodiment of the present invention, in the steps 315 and 316, when the user selects the desired frame among the compressed moving image frames, e.g., by clicking a mouse (not shown) on the frame 936, the server 500 first searches for a closest modified frame and then supplies the closest modified frame as the matched modified frame corresponding to the selected desired frame based on the location information thereof.

In accordance with another preferred embodiment of the present invention, in the step 316, when the user selects the desired frame, the server 500 may provide the closest modified frame, its previous modified frame and its following modified frame as corresponding matched modified frames. For example, referring to FIG. 3C, there are represented an exemplary closest modified frame 953, its previous modified frame 951 and its following modified frame 956 for the desired frame 936.

In accordance with yet another preferred embodiment of the present invention, the server 500 stores matched modified frames corresponding to all compressed moving image frames to be supplied to the user in the database 520. In other words, a corresponding closest modified frame for each of the compressed moving image frames is previously stored in the database 520 and then if a user selects a desired frame, the server 500 provides one or more corresponding matched modified frame to the user. This facilitates the process of providing one or more matched modified frames.

In FIG. 3C, there are various events in the modified frames 951, 953 and .956 in a web-page 950. The various events may represent corresponding objects, e.g., a radio, a blue cap and a bottle indicated by predetermined images, e.g., hand images 952, 954 and 955 as shown in FIG. 3C, respectively. In the above, the objects are products; but the object may be formless services, e.g., a game program, touring information and so on.

These events may be offered to the user as certain predetermined shapes, e.g., a hand, a triangle, an arrow and so on. Further, a certain brief description, e.g., viewing the name of the object represented by the corresponding event, may be provided on or near an image of an event. In some case, the whole frame represents an object, e.g., viewing a company or an advertisement. In this case, the event may be inserted at a certain position thereon with a corresponding description.

Next, at a step 317, the user selects a desired event. Then at a step 318, the server 500 provides corresponding object information of the selected desired event to the user, wherein the object information is previously stored in the object information database 300 of the system 50. FIG. 3D offers an exemplary web-page 970 including an image 971 providing information for an object, e.g., a blue cap indicated by a hand image 954 as shown in FIG. 3C. Then the process is ended. It should be noted that information for an object may be offered to a corresponding user as moving image frames.

In accordance with a preferred embodiment of the present invention, the process for providing object information may further include a step that the server 500 allows the user to connect itself to a corresponding shopping site, e.g., through a bar 975 as shown in FIG. 3D, of the product indicated by the corresponding object.

Further, for example, the image 971 may include a details menu 972 to inform the user of the detailed information on the product and a related products bar 973 to offer the information on products closely related to the product.

In accordance with another preferred embodiment of the present invention, when the user interfaces are digital TV's, event for an object representing a predetermined company or a product may appear at a corner of a screen as a rectangular window shape, e.g., by using the so-called picture-in-picture technique, of the digital TV's whenever the user selects a desired frame.

While the present invention has been described with respect to certain preferred embodiments only, other modifications and variations may be made without departing from the scope and spirit of the present invention as set forth in the following claims.

What is claimed is:

1. A method for editing moving image data and providing object information based on the moving image data for use in an object information providing system, the system including a server, a plurality of user interfaces and a communication network connecting the user interfaces to the server, the method comprising the steps of:

(a) compressing the moving image data having a plurality of frames, thereby supplying compressed moving image frames;

(b) storing the compressed moving image frames;

(c) extracting frames from the compressed moving image frames in a preset extraction ratio by employing a predetermined technique, thereby obtaining extracted frames and location information thereof within the compressed moving image frames;

(d) inserting one or more events at corresponding predetermined positions in each of the extracted frames to thereby supply modified frames, wherein each event is an image of predetermined shape indicating a corresponding object in each of the modified frames;

(e) storing the modified frames;

(f) at the server's end, offering an initial information page to a user through a corresponding user interface;

(g) at the user's end, based on the initial information page, choosing a desired program having the compressed moving image frames through the corresponding user interface;

(h) at the server's end, providing the desired program to the user; and (i) at the server's end, when the user selects a desired frame among the compressed moving image frames, supplying a matched modified frame corresponding to the selected desired frame based on the location information thereof, wherein the matched modified frame is a closest modified frame to the desired frame.

2. The method according to claim 1, further comprising the step of:

(j) at the server's end, when the user selects a desired event in the matched modified frame, providing corresponding object information of the desired event to the user, wherein the object information is previously stored in an object information database of the system.

3. The method according to claim 2, wherein said object information includes product and vendor related information for the object.

4. The method according to claim 2, wherein said communication network is an internet.

5. The method according to claim 4, wherein the user interfaces are personal computers, respectively.

6. The method according to claim 1, wherein said communication network is a broadcast transmission network.

7. The method according to claim 6, wherein the user interfaces are wireless mobile phones, respectively.

8. The method according to claim 6, wherein the user interfaces are digital TV's, respectively.

9. The method according to claim 2, wherein said all the steps (f) to (j) are performed in real-time.

10. The method according to claim 4, further comprising the step of:

(k) at the server's end, when the user selects the desired event in the matched modified frames, connecting the corresponding user interface to a corresponding shopping-mall site over the internet.

11. The method according to claim 1, wherein said step (i) includes the steps of:
   (i1) at the server's end, when the user selects the desired frame among the compressed moving image frames, searching for a closest modified frame to the desired frame; and
   (i2) supplying the closest modified frame as the matched modified frame corresponding to the desired frame based on the location information thereof.

12. The method according to claim 1, wherein said step (c) includes the steps of:
   (c1) searching for candidate extracting frames in a preset extraction ratio from the compressed moving image frames;
   (c2) estimating a degree of similarity between adjacent candidate extracting frames by employing a motion estimation technique; and
   (c3) selecting, based on the result of the estimated degree of similarity obtained, the extracting frames among the candidate extracting frames, thereby obtaining the extracted frames and the location information thereof within the compressed moving image frames, wherein the extracted frames are the candidate extracting frames in which the similarity obtained is equal to or less than a predetermined threshold.

13. The method according to claim 1, wherein an object of said object information represents a corresponding product or item in a corresponding modified frame appearing as a predetermined shape or image viewed on a screen of the corresponding user interface.

14. The method according to claim 1, wherein in said step (i), previous and following modified frames of the matched modified frame are further supplied.

15. The method according to claim 1, wherein in said step (c), the preset extraction ratio is expressed as F1/F2, wherein F1 and F2 represent the number of frames in the original compressed moving image frames and the number of the extracted frames, respectively.

16. The method according to claim 1, wherein in said step (c), the predetermined technique is a decimation technique.

* * * * *